United States Patent [19]

McCombs

[11] 4,378,982

[45] Apr. 5, 1983

[54] COMPACT OXYGEN CONCENTRATOR

[75] Inventor: Norman R. McCombs, Tonawanda, N.Y.

[73] Assignee: Greene & Kellogg, Inc., Tonawanda, N.Y.

[21] Appl. No.: 297,361

[22] Filed: Aug. 28, 1981

[51] Int. Cl.$^3$ ............................................. B01D 53/04
[52] U.S. Cl. ....................................... 55/162; 55/179; 55/387
[58] Field of Search ............... 55/33, 74, 75, 160–163, 55/179, 180, 387, 389

[56] References Cited

U.S. PATENT DOCUMENTS

| | | | |
|---|---|---|---|
| 2,572,009 | 10/1951 | Carson | 55/161 |
| 2,625,237 | 1/1953 | Grilder et al. | 55/179 X |
| 2,790,512 | 4/1957 | Dous | 55/74 X |
| 3,069,830 | 12/1962 | Skarstrom et al. | 55/179 X |
| 4,194,890 | 3/1980 | McCombs et al. | 55/179 X |
| 4,272,265 | 6/1981 | Snyder | 55/179 X |
| 4,302,224 | 11/1981 | McCombs et al. | 55/179 X |

*Primary Examiner*—Robert H. Spitzer
*Attorney, Agent, or Firm*—Browdy and Neimark

[57] ABSTRACT

A machine for concentrating the oxygen in air, especially for medical purposes utilizing a pressure swing adsorption (PSA) technique. The machine includes a combination of features to provide an extremely light weight reliable and compact device, which operates at a low noise level, and is especially suited for home use.

64 Claims, 10 Drawing Figures

COMPACT OXYGEN CONCENTRATOR

This invention relates to devices for concentrating a particular gas out of a mixture of gases. More in particular, it pertains to a device for providing oxygen enriched air for medical purposes.

This invention is related to, in the sense of being the next generation of development of, the earlier oxygen concentrator shown, described and claimed in a copending application Ser. No. 84,374, filed on Oct. 12, 1979, entitled "COMPACT OXYGEN CONCENTRATOR" by Norman McCombs (the inventor hereof), assigned to the same assignee as the present invention, and now issued as U.S. Pat. No. 4,342,573.

The present invention includes virtually all of the advantages over the prior art as are achieved by the earlier version. In addition, the present invention also improves upon said earlier version, specifically in the areas of weight, size and operating noise reductions, and reduction of cost and materials for fabrication. Specifically, it is anticipated that the present invention will achieve cost reductions on the order of 25% over the oxygen concentrator of the prior application. At the same time, the numerous features of the present invention produce a functionally equal machine which is substantially reduced in size and weight. Size, noise, and weight reductions are very important in this area since such machines are often used by sick, elderly, and/or infirm persons.

The present invention is not concerned with any particular pressure swing adsorption (PSA) cycle per se. The invention can be used with virtually any such cycle, and has the capacity to operate many different multi-bed or single bed cycles, with suitable modifications to the inter-connections between the valves, and/or changes to the vessels in the bed vessel module. Thus, another advantage of the invention is that it is amendable to use with a multitude of different PSA cycles and configurations.

More specifically, the present invention comprises a combination of specific features and improvements which together combine a yield the above advantages and improvements.

One feature is improved means for deadening sound normally made at the intake side of the air compressor. This feature comprises an intake tube of predetermined length and diameter, which has been found to yield a "tuned" effect, which deadens the sound.

Another feature pertains to the improved adsorbent bed design which yields numerous advantages. An annular arrangement of the working bed is provided, which annular structure effectually doubles the length of the bed in a single length of pipe. The length of the bed is in effect nested around itself. This produces additional advantages of providing all the connections at the top, permitting flow from inside to the outside or visa-versa, and generally provides a compact, light-weight bed arrangement. In addition, the bed is modular and includes means to cooperate with the compressor intake hose so that the feature works even more efficiently.

Another aspect of the improvement of the invention pertains to an arrangement in the lower section in combination with the air compressor wherein a plenum or silencing chamber is provided at the exhaust of the fan which drives the cooling air through the machine, which chamber substantially reduces the sound produced by the fan, thus further enhancing the advantages of the invention in the market place.

A further feature pertains to an improved shipping securing means wherein an exceedingly simple arrangement of a screw and a wing nut holds the heavy compressor in place for shipment, is then easily and readily removed prior to use, and is thereafter available again should the machine have to be shipped again.

The improved light-weight and compactness of the invention also includes improved handle modules, front and rear in the cabinet, which handles serve multi-purposes. In addition to providing means for carrying the machine, the handles have built into them many necessary functions, including a flow control meter, on-off switch, pilot light, fuse, and elapsed time meter. The front handle also includes an inclined front face in which many of these functional devices are mounted, which makes using them much more convenient. By providing these multiple uses from the handles, the compactness of the resultant machine is greatly enhanced.

The reduction in manufacturing costs is at least in substantial measure attributable to a modular approach of construction used in the present invention. The entire machine is reduced to a plurality of individual modules each of which can be separately fabricated to thus greatly simplify overall construction. The final building thus comprises simply the assemblying of the preassembled modules. These modules include the bed assembly mentioned above, a main deck which includes all the electrical and many of the other parts, the handles, and the cabinet. The prefabricated modules are mounted in the cabinet, put together with simple electrical and pneumatic connections, and the construction of the machine overall is substantially complete.

Yet a further element going into the size and weight reduction is the provision of double purpose functions given to one of the valves. It is advantageous to "dump" the compressor output until the compressor and other parts of the machine are up to running speed. Heretofore, it has been common to provide a separate dump valve in the compressor outlet. The present invention, utilizing a relatively simple modification to the electrical circuitry, causes the dumping function to be done by one of the valves already needed for the normal operation of the PSA cycle which the machine is performing.

The above and other advantages of the invention will be pointed out or will become evident in the following detailed description and claims, and in the accompanying drawings also forming a part of the disclosure, in which:

Figure 1:
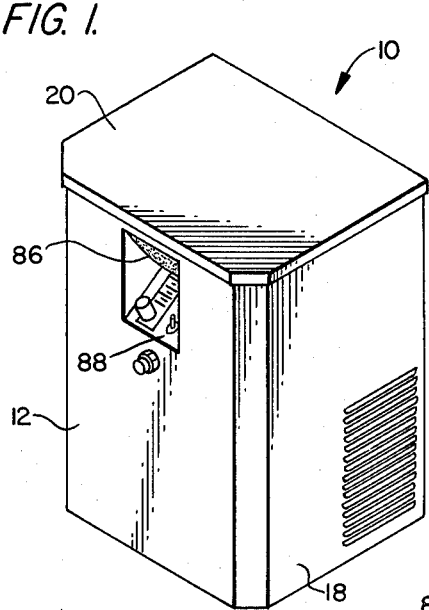
FIG. 1 is a front side perspective view of a machine embodying the invention.
Figure 2:
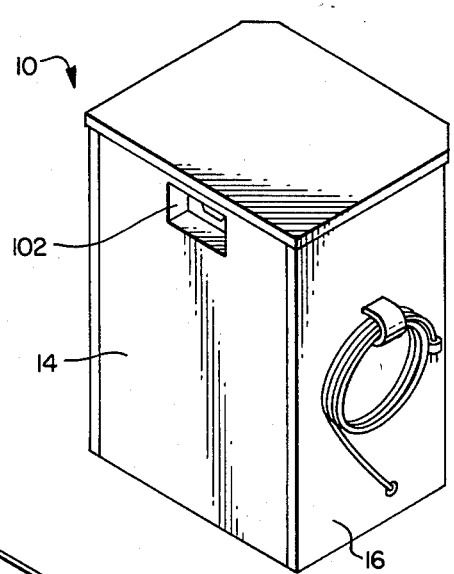
FIG. 2 is a rear side perspective view turned 180° from the FIG. 1 showing.
Figure 3:
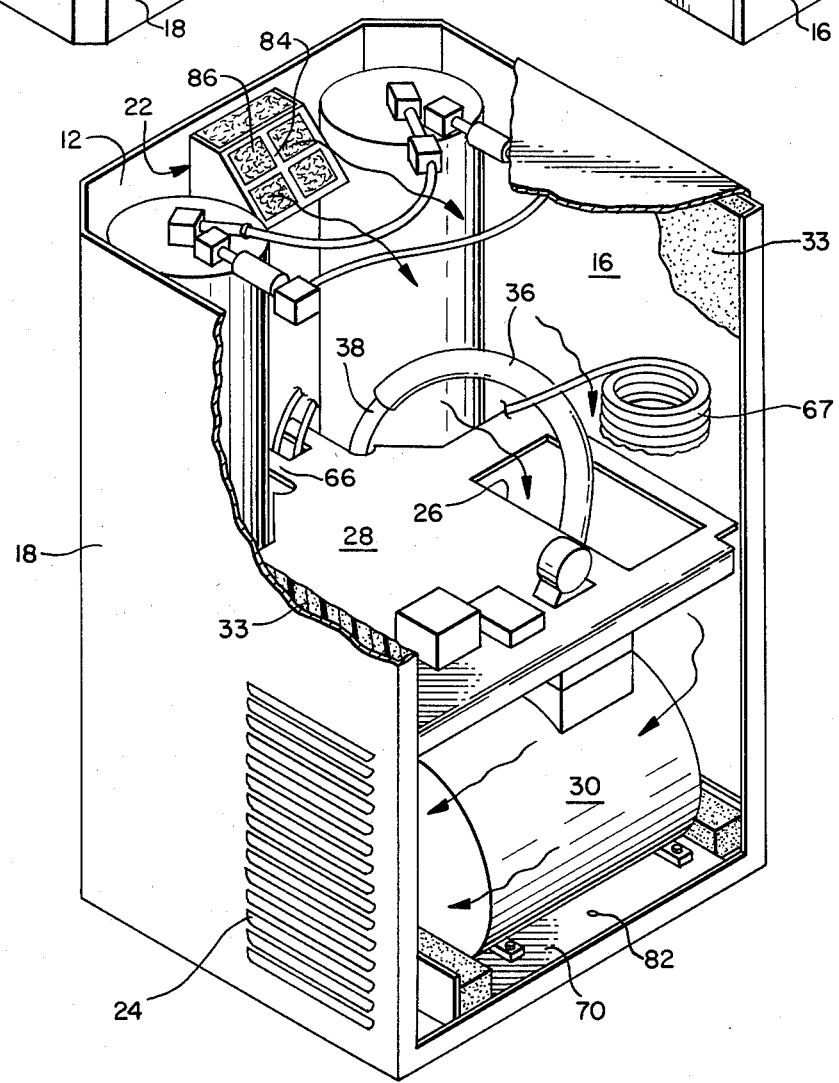
FIG. 3 is a rear side perspective view with the rear cover removed and parts of one wall, the lid and certain internal components broken away or omitted for the sake of clarity.
Figure 6:
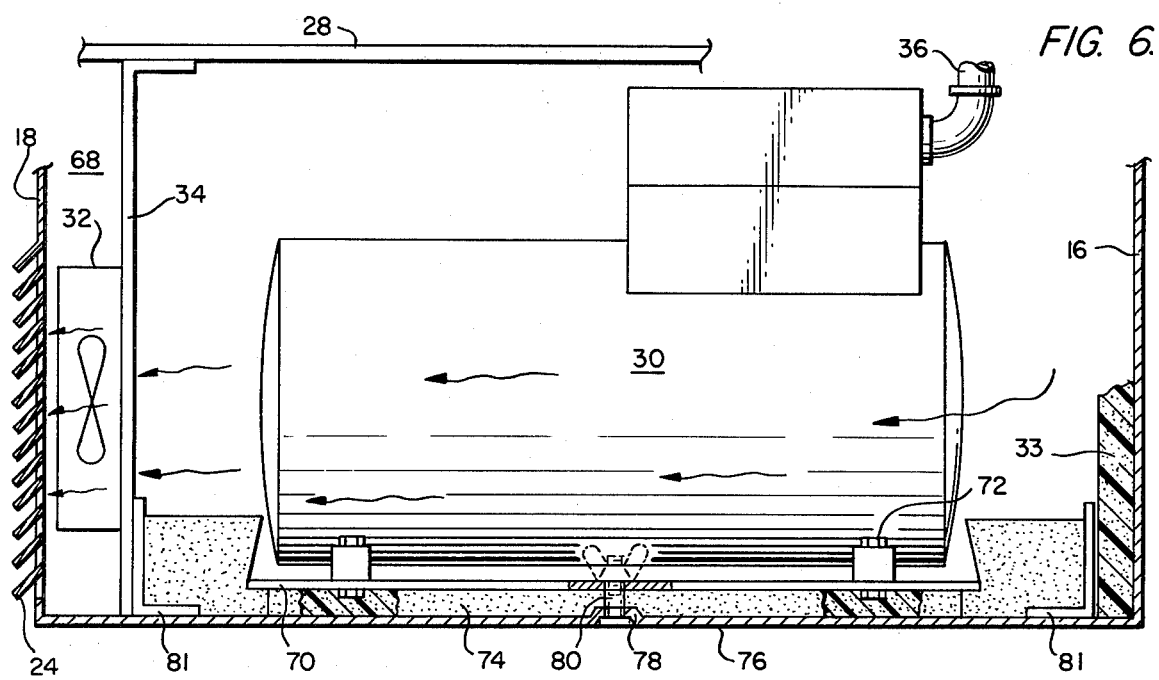
FIGS. 6 and 7 are similar views showing first and second embodiments of the sound deadening cooling air exhaust chamber.

Referring now in detail to the drawings, in FIGS. 1, 2 and 3 there is shown the preferred embodiment of a machine 10 embodying the invention. Machine 10 has a front side 12, a rear side in the form of a panel 14, left and right sides 16 and 18, and a top in the form of a separate lid 20. With the lid 20 and the rear panel 14 in place, a substantially air-tight cabinet is formed for containing the internal parts. Means are provided to permit a flow of room air through this cabinet for purposes of cooling the internal components, particularly the air compressor. This is in addition to the process air which is drawn from inside the cabinet as well. The flow of process air is considerably smaller than the flow of cooling air. For this purpose, the front wall 12 is provided with a front handle module 22 which also permits an inflow of air. The handle module is shown more in detail in FIGS. 1, 3 and 8, and is described more in detail below. The right side wall 18 is formed with a set of louvers 24 to permit exiting of the cooling air. As shown in FIG. 3, the flow path is through the front handle 22, filling the upper part of the internal space above the main deck 28. The cooling air then goes through an opening 26 in the main deck 28. Referring now to FIG. 6, the air, upon entering the lower chamber below the main deck 28, flows over the motor-compressor 30, and exits through the louvers 24. The entire cooling air flow is driven by a fan 32 mounted on a vertical wall 34. The construction of these parts 32 and 34 together with louvers 34 will be described in more detail below in conjunction with the description of FIGS. 6 and 7.

Means are provided to deaden the sound of the intake of air to the motor/compressor 30. To this end, a relatively large diameter intake hose 36, shown in FIG. 6, extends up through opening 26, see FIG. 3, and is joined to a relatively small diameter hose 38, shown in FIG. 5. The particular materials, types and configurations of the hoses 36 and 38 are unimportant. The hose 36 in particular is merely a connector, and is not particularly functional as to the sound deadening advantage. The effective diameter and length of the hose 38 has been found to have a substantial effect on the total sound produced by the machine 10. Further, the particular connection shown by way of example in FIG. 5 between the two hoses 36 and 38 has been found to be unimportant. In the successfully constructed embodiment, it has been found that a 6 inch length of $\frac{3}{8}$ of an inch diameter plastic tubing works quite well in deadening the sound of the particular motor/compressor used in that embodiment.

Figure 4:
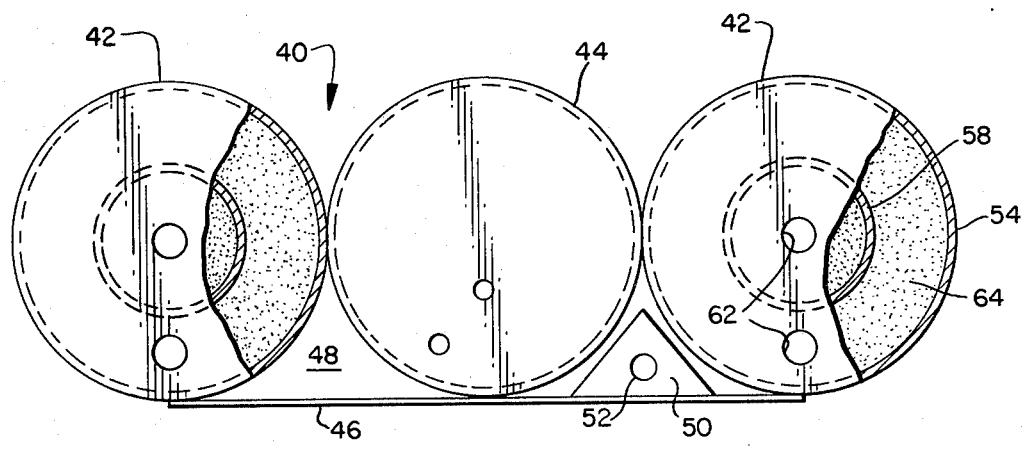
FIG. 4 is a top plan view of the adsorbent bed module with some parts broken away and in cross-section.
Figure 5:
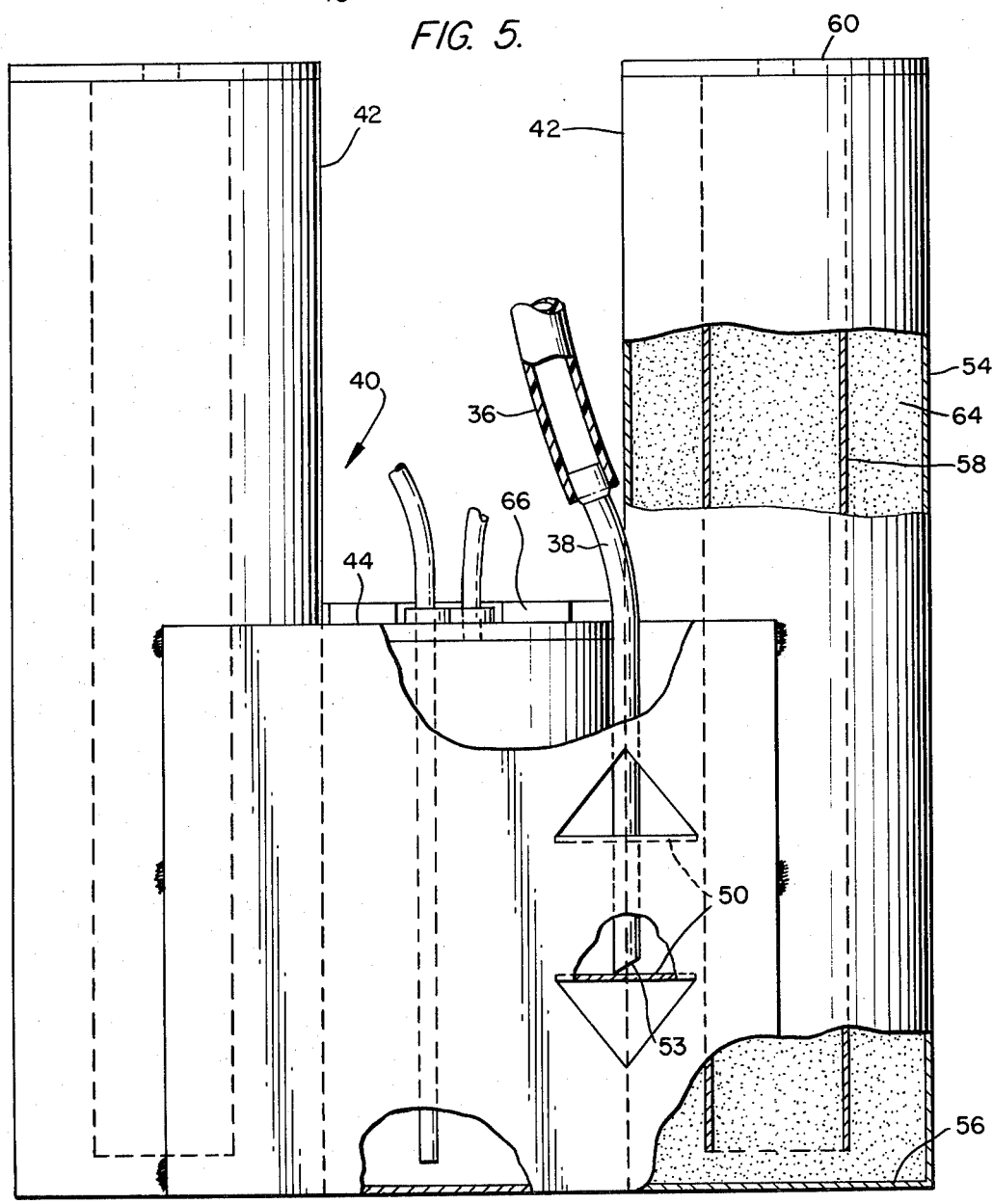
FIG. 5 is a vertical elevational view of the bed module with some parts broken away and in cross-section.

Further, it has been found that having the inlet end of this hose 38 located in a more or less separate chamber has an additional advantageous effect on sound deadening. To this end, in accordance with the goals of the invention of providing an improved compact and light weight device, such a chamber has been in effect made out of the otherwise wasted space in the adsorbent bed module 40 as shown in FIGS. 4 and 5.

Module 40 comprises a pair of larger outside working adsorbent beds 42, and a center smaller and shorter tank 44. The three tanks 42 and 44 are joined together by a plate 46. As shown in FIG. 4, the tanks 42 and 44 are of circular cross-sectional shape, and thus they define, together with the assembly plate 46, a pair of generally triangular spaces 48 which extend between the tanks and for the height of the shorter center tank 44. One of these spaces, the right hand side one in FIGS. 4 and 5, is utilized as the intake space for sound deadening for the intake end of the hose 38. To this end, the wall 46 is formed with a pair of cutouts 50, upper and lower, with the upper cutout being formed with a round opening 52 of a diameter to snuggly receive the compressor intake hose 38. The bottom cutout 50 is not formed with such an opening. The end of the hose 38 is cut off at an angle as indicated at 53 so that, in assembly, the hose 38 can be simply pushed down through the opening 52 in the upper cutout 50 until it bottoms against the lower cutout 50, the diagonal cutoff end 53 serving to assure that air will be drawn into the hose. That is, absent the diagonal cut 53, the end of the hose could fit flush against the wall of the bottom cutout 50 to thus block the air inlet to the compressor.

Thus, the "chamber" is formed by the space 48, and the angled intake end 53 of the hose 38 to the compressor is located at any predetermined position therein by virtue of the location of the two cutouts 50 in the wall 46 defining the spaces 48.

As mentioned above, the connecting hose 36 is designed so as to have little or no effect on sound deadening. It is of a relatively large diameter so that the sound deadening effect will be concentrated by the hose 38 in the space 48. Further, the hose 36 is of a relatively large diameter so that it will not create any additional pressure drop in the system, and is of relatively large diameter so that it can take the handling and bending necessary to position it inside the cabinet of machine 10.

The prefabricated bed module 40 is an important feature to produce the advantageous compact low cost machine of the invention. More in particular, the working beds 42 are of an annular configuration, and comprise an outer pipe 54, having an end wall 56, and inner pipe 58, and a lid or cap 60. The inner pipe 58 is concentrically located within the outer pipe 54, and is of a length such as to terminate short of the bottom wall 56. The lid 60 is formed with a pair of openings 62 formed one within the inner pipe 58, and one over the space between the inner and outer pipes 54 and 58. The entire space within the bed defined by outer pipe 54 and the lid 60 and bottom 56 is filled with any suitable adsorbent material, such as silica gel, molecular sieves of various sorts, carbon, or the like materials. Suitable fittings will be provided in openings 62 to provide a gas flow path through the adsorbent material 64. The gas flow can be in the center opening, down through the middle of 58, and then up the annulus; or in the reverse direction, i.e., in to the annulus.

As is now clear, the provision of this annular or nested within itself bed provides important advantages over the prior art. In particular, a bed having an effective length of substantially double the length of the pipe 54 as provided by virtue of the annular arrangement. Further, the gas flow can be in either direction, which is important when back flushing the adsorbent material 64, or as may be required in other cycles which can be embodied into the machine 10 of the invention.

The term "pipe" as used in the specification and claims herein, shall be understood to mean any sort of container suitable for containing the adsorbent material 64 and amendable to fabrication in accordance with the concepts of the nested construction shown in FIG. 5, in order to produce a bed having an operating length of approximately twice its physical length. Thus, the word "pipes," as well as the words "annular" or "annulus," shall be understood to not be limited to those sorts of constructions in which the cross sectional shape is circular, but also to include other such shapes, such as square, triangular, oval, hexagonal, or any other such shape of container which could be used in accordance with the teachings of the invention.

In regard to cycles, very many different cycles can be performed by the invention device. For that reason, the particular cycle operated is not a material part of this invention. Reference can be had for a teaching in that regard to U.S. Pat. No. 4,194,890 issued Mar. 25, 1980 by the present inventor together with Edward Vrana, and assigned to the same assignee as the present invention.

The center tank 44 is shown empty, but in other embodiments or with particular cycles, this bed could also be full of adsorbent material, or it could be omitted entirely. For example, tank 44 could be made to function as the segregated storage adsorption bed 32 of the McCombs and Vrana patent mentioned above.

As is clear from FIGS. 4 and 5, the entire assembly of the three tanks 42 and 44 on the plate 46, together with the portions 50 and 52 thereof for cooperation with the sound deadening feature of the hose 38, can be prefabricated before assembly into device 10. This prefabrication, or modular manufacturing approach to the bed module 40, is an important facet of the overall improvements of the invention pertaining to reduced costs of manufacture and compact size.

Another facet of the overall modular approach of the invention relates to the main deck 28, described briefly above, which divides the space inside the cabinet into upper and lower sections. The lower section mounts the motor/compressor 30, and the fan 32 for driving the cooling air through the machine. The bulk of the components, pieces of equipment and the like needed to carry out a particular cycle being performed by the machine 10 are mounted on the deck 28, and some of these pieces are shown by way of example, but they need not be described herein in detail. Main deck 28 comprises a front end finger portion 66 which rests on the top surface of the center tank 44 in the bed module 40, see FIG. 5, for purposes of supporting the front end of the main deck 28. The rear end of the main deck 28 is supported the top end of the vertical wall 34 on which is mounted the cooling fan 32, see FIG. 6. Wall 32 extends front to rear of the cabinet from the vicinity of the rear panel 14 to the corresponding tank 42 in the bed module 40. This wall is omitted in FIG. 3 in order that other features can be shown.

The main deck 28 is also mounted on suitable support means, not shown, on the inside of the left hand wall 16. Another facet of the invention which goes into its total advantages over the prior art of low cost of manufacture and compact size is that the main deck 28 is made to snuggly fit in its space and on top of its three point support, i.e., on the top of the center tank 44, the top of the wall 34, and the support means on the inside of the side wall 16; with no further securing means. Thus, manufacturing and assembly time, as well as labor and parts are saved by simply setting this wall or main deck module with all its components pre-mounted thereon on top of the three point support.

Figure 9:
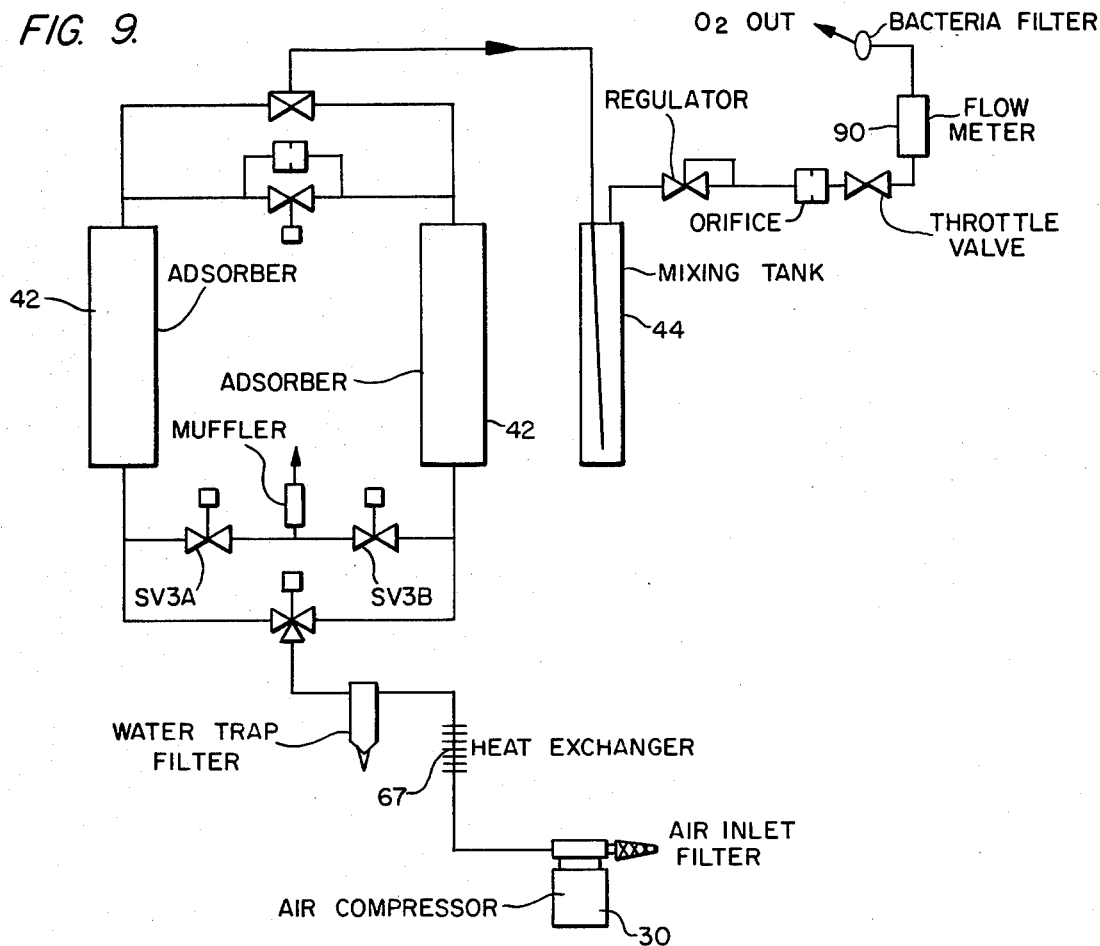
FIG. 9 is an overall and flow schematic diagram of the operating cycle used in the preferred embodiment of the present invention.

Thus, the modular approach of the invention includes the prefabrication of the bed module 40, the prefabrication of main deck 28 with most of the components required in the machine for carrying out a particular cycle, the prefabrication of the cabinet, and the prefabrication of the handle modules. Then certain flow manifolds, not shown specifically in the drawings but shown schematically in FIG. 9, are later assembled to these components, together with the necessary tubings and wiring and the like, some of which is shown in FIG. 3, to thereby complete manufacture of the machine at substantial cost savings as compared to prior art machines made in accordance with prior methods.

Figure 7:
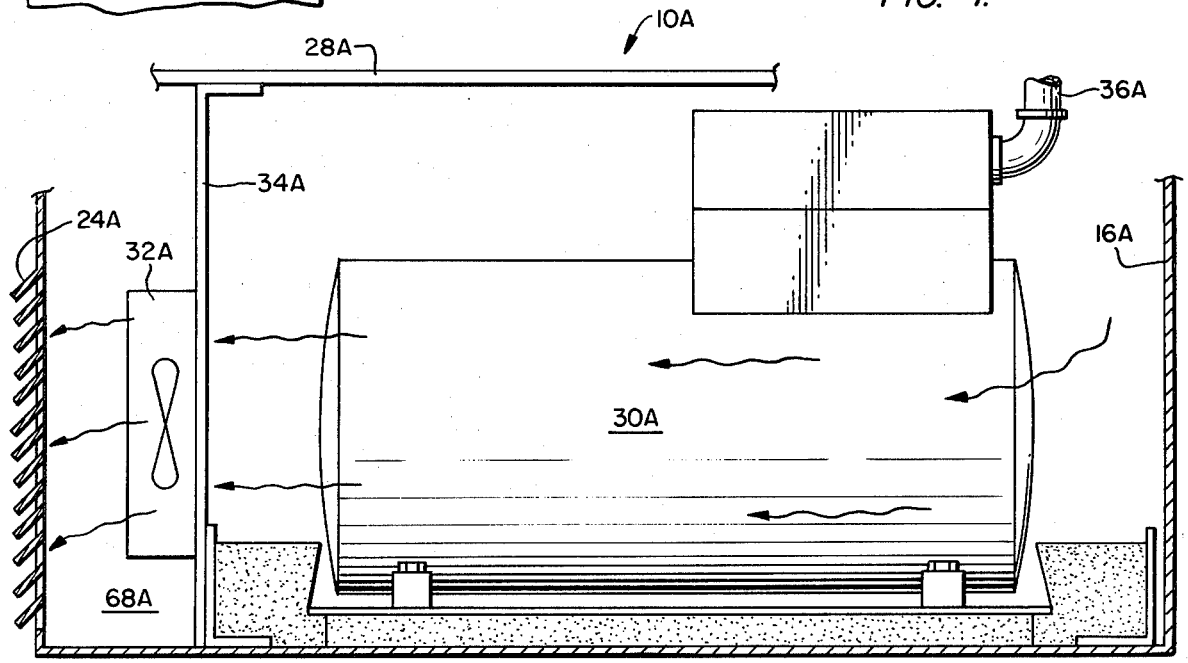

Referring now to FIGS. 6 and 7, there are shown two similar embodiments of the invention, specifically the lower sections thereof under the respective main decks 28 or 28A. Parts shown in FIG. 7 as to the second embodiment the same as or similar to parts described above are indicated by the same reference numeral followed by "A."

The vertical wall 34 and the right side wall of the cabinet 18 together define a chamber 68 therebetween in which is mounted the main cooling fan 32. The positioning of the fan 32 within this chamber 68 has been found to have a further sound deadening effect, in that the sounds from the fan 32 are thereby significantly muffled. FIG. 7 shows a second embodiment 10A, quite similar to the embodiment 10 of FIG. 6 at least as to the lower chamber for the motor/compressor and the chamber 68A herein is considerably bigger than the chamber 68. The fan 32A and motor compressor 30A of this second embodiment are of different sizes and capacities, and thus it has been found that a different size chamber deadens the noise better in the embodiment 10A then a relatively smaller chamber 68 of FIG. 6.

Another feature of the invention is the method of mounting the motor/compressor and the shipping protecting means of the invention. Referring to FIG. 6, the motor/compressor 30 is fixed to a plate 70 by nut and bolt assemblies 72. The assemblage of the parts 30, 70 and 72 floats freely on a relatively thick bed of foam plastic insulating material 74. It has been found that this arrangement of allowing the motor/compressor to sit on its bed 74 of foam is highly satisfactory in use, that the motor/compressor is free to move a bit in use, and weight and parts are reduced. However, having the motor/compressor 30, which is a relatively heavy component, free to move about when the unit is shipped is highly undesirable, in that damage could ensue. To this end therefore, the bottom wall 76 of the cabinet is provided with a dimple 78 in which there is mounted a bolt and wing nut assembly 80. A relatively large clearance opening for the bolt 80 is provided in plate 70, this opening 82 showing most clearly in FIG. 3. As is clear from FIG. 3, when the back panel 14 is removed, this wing nut 80 is readily accesible and can be removed. If shipment is again desired, the plate 70 is merely depressed on the bed of foam, the wing nut reattached, and the heavy motor/compressor 30 is secured for shipment.

Another facet of this mounting system is that the plate 70 to which the motor/compressor is mounted distributes the weight of this relatively heavy component over the bed or layer of plastic foam 74 on which it sits. The logic is analogous to that of a snowshoe. As shown in FIG. 6, other parts of the foam 74 under the motor/compressor are not compressed and are filled in between a pair of left and right angle members 81 which define the space in which the motor/compressor is located. This in effect presses the outboard parts of the foam 74 to in effect cradle the motor/compressor on its plate 70 within the lower cabinet space.

Another feature of the invention resides in the improved combined handle modules described briefly above, and which can best be seen in FIGS. 1, 2, 3 and 8. The front handle module 22 comprises an inside grid structure 84 in which is mounted a filter member 86, which may comprise a sheet of foam plastic material of a suitable type. The assembly 22 further includes a front sloped wall 88, see FIGS. 1 and 8, on which is mounted numerous other dials and controls which in prior machines are spread about all over the cabinet. These include a flow control knob 90 to adjust the amount of oxygen enriched air delivered out of the fitting 92 to the user, a main on-off switch 94, a pilot light 96, and a fuse 98. Finally, the handle module includes a short upper horizontal wall 100 which is the handle proper by which a user can grasp and lift the machine.

Figure 8:
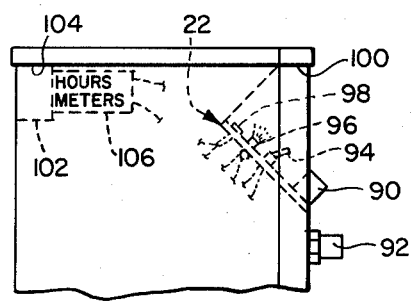
FIG. 8 is a partial side elevational view of the preferred embodiment showing the handle modules in the cabinet.

The rear handle module 102, shown in FIGS. 2 and 8, comprises a horizontal wall 104 similar to the wall 100 in the front handle module 22, and also mounts a meter 106 for measuring the total elapsed time of operation of the device, such meters being conventionally provided in medical devices of the type of the present invention.

Referring to FIGS. 1 and 8, the wall 88 on which the various controls and the like needed by the user, including the flow controller 90, the on-off switch 94, the pilot light 96 and the fuse 98, is mounted at a 45° angle to the plane of the front wall 12. This positioning of these controls, and the locating of all the controls in that one wall of the composite handle, makes it extremely simple and convenient for a user to get at the controls. Further, means are provided but not shown, to light up the flow meter controlled by the knob 90, so that that device can be conveniently used at night. This night light is built into, functionally, the flow meter itself, the body of which is made of plastic which makes an excellent light transmitting medium. Angles other than 45° can be used, but it has been found, for this particular height of unit which is normally positioned on the floor, that 45° is the best angle. This advantage of ready accessibility and easy reading of the controls is combined with the composite handle which permits a prefabricated handle module including those controls, as well as the cooling air intake filter 86 to be made into the single front handle module.

In cooperation therewith, referring to FIG. 8, the two horizontal walls 100 and 104 are, as a convenience in manufacturing, part of the material of which the cabinet is made, rather than part of the handle modules themselves. In this manner, when fabricating the cabinet, those short walls can be simply bent in, and then serve as a locating point and a mounting place to which the handle modules are mounted. Material is thus saved, and manufacturing is simplified.

The wall 88 was omitted in FIG. 3 in order that other parts of the apparatus would appear more clearly, and to emphasize the mounting of the filter element 86.

Another advantage of this improved combined handle module, and especially the front module 22, is that the filter pad 86 is very readily mounted and dismounted, as for cleaning or replacement as is periodically required, by simply pushing it in or pulling it out from the front of the cabinet.

Referring now to FIG. 9, many of the parts described above appear therein, and the overall method of operation will be clear to those skilled in the art, taken together with references to the patents mentioned above, as needed.

The heat exchanger 67 is the same coil shown in FIG. 3, and it is positioned closely adjacent the opening 26 so as to be well positioned in the flow of cooling air through the cabinet. It is also to be noted that a relatively small number, four in particular, solenoid valves are needed in the successfully constructed embodiment. This is a substantial reduction over many prior art machines in which significantly more solenoid valves are required. The reduction of solenoid valves, of course, reduces cost of parts, labor and size and weight of the equipment. All of the remaining valves, orfices and the like, are marked in the drawing and no further detailed explanation is deemed necessary.

An important aspect of the invention's improvement in the area of noise reduction resides in the arrangement of the parts such that there is no straight line or line-of-sight exit of the sound from the compressor 30 to the outside. Referring to FIGS. 1 and 6, it can be seen that the cooling air entering through the front handle filter 86 first fills the entire upper cabinet space, then passes through the opening 26 in the main deck 28. Thereafter, referring to FIG. 6, it enters at the right hand side of the motor/compressor 30. The cylindrical part at the bottom is the electrical motor, and the upper part to which the larger hose 36 is attached is the compressor proper. It is this compressor which is the major source of noise in those devices. The entire inside of the cabinet, at all flat surfaces thereof, is lined with plastic foam insulation 33, only small pieces of which are shown in the drawings so as to not clutter the drawings. The fan 32 at the left hand side, together with its chamber 68, is a substantial blockage to sound from the compressor exiting through the louvers 24. Going the other way, the sound must go to the right, then up the hole 26, and then in a tortuous path around the various pieces of equipment and the insulated walls in the upper chamber before exiting through the front handle. The rear handle 102 does not present openings for sound to exit from the cabinet. Thus, the sound from the compressor 30 has no direct exit from the cabinet, tortuous paths only are presented, and these paths are lined with the insulating material 33, requiring the sound to make many bounces before it reaches an opening in the cabinet. This bouncing, of course, absorbs the bulk of the sound energy.

Referring now to the last sheet of the drawings, FIG. 9 shows the overall apparatus of the invention in schematic form, which showing is provided in order to complete the teaching. This showing is exempletive only, and many other types and arrangements of parts, such as are shown in the two patents mentioned above, could also be used in accordance with the teachings of the invention.

Figure 10:
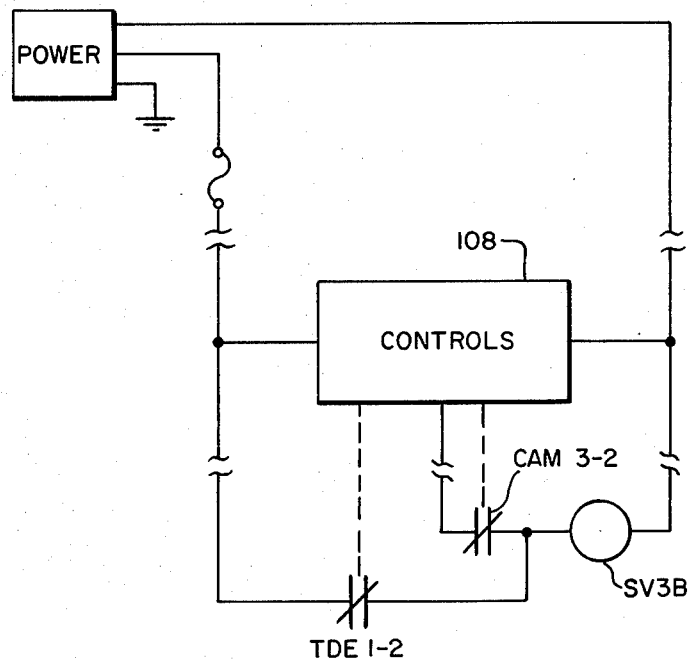
FIG. 10 is a simplified partial electrical schematic diagram.

FIG. 10 shows another feature of the invention. It is conventional in many prior art machines of the type to which the present invention belongs to provide a valve to "dump" or simply release to atmosphere, the output of the compressor 30 until the equipment comes up to speed. This has typically included the use of a special solenoid valve for that purpose only. In the present invention, that function is provided by the solenoid valve SV3B, which is one of the process valves used in the ordinary application of the cycle being carried out by the preferred embodiment 10. The way the dumping or unloading of the compressor at start-up is accomplished is by the provision of an additional relay contact TDE1-2 in series circuit with the coil of the valve SV3B. Upon starting up the machine, the remainder of the controls, indicated generally and collectively by the block 108 in FIG. 10, includes a time delay means which operates this normally closed contact TDE1-2. Thus, at the end of a predetermined length of time, for example five seconds in the successfully constructed embodiment, these contacts open. For that delay period, the contacts TDE1-2 will be not activated, thus closing SV3B to vent the output of the compressor. At the end of the predetermined time, the contacts TDE1-2 are activated, thus going into the open position, and remaining in that open position, having no effect on the operation of SV3B until start-up is again required. During normal operations, the parallel contacts CAM3-2 operate the solenoid valve SV3B in accordance with the demands of the particular cycle being implemented.

Thus, by provision of this additional relay contact and simple rewiring including the time delay means in the controls 108, the existing valve SV3B is caused to do double duty, the additional dump solenoid valve is eliminated, together with its wirings and controls, and the machine of the invention is further reduced in size, weight and manufacturing cost.

While the invention has been described in detail above, it is to be understood that this detailed description is by way of example only, and the protection granted is to be limited only within the spirit of the invention and the scope of the following claims.

I claim:

1. A vessel for an adsorbent bed for use in a PSA machine comprising a first pipe of predetermined length, comprising the body of said vessel, a second pipe of a predetermined length shorter than said first pipe and positioned within said first pipe to create an annular space between said first and second pipes, means to close both ends of said first pipe, one of said end closing means for said first pipe also closing one end of said second pipe, said one end closing means comprising a cap member having a shape corresponding to the cross-sectional shape of said first pipe, means to sealingly mount said cap members on both of said one ends of said first and second pipes, and means to permit a flow of gas in and out of said vessel through said cap member communicating separately and directly with each of said annular space and the space inside said second pipe, whereby the functional length of an adsorbent bed in said vessel is substantially equal to twice the length of said first pipe and the physical length of said vessel is substantially equal to the length of said first pipe.

2. The combination of claim 1, wherein a plurality of said vessels are joined together along their lengths to thereby produce a pre-fabricated adsorbent bed module for use in a compact housing for said PSA machine.

3. The combination of claim 2, wherein said module comprises two of said vessels each having a first pipe of substantially equal length and a third vessel substantially shorter than said first two vessels, and plate means to join said three vessels together in a side by side relationship to thereby from said adsorbent bed module.

4. The combination of claim 1, and adsorbent material filling the space within said first and second pipes.

5. The combination of claim 1, both of said pipes being of circular cross-section.

6. The combination of claim 1, said vessel being mounted in a machine for separating a component gas out of a mixture of gases using a PSA technique, said machine including a gas compressor, means for deadening the sound of the gas intake to said compressor, and said sound deadening means comprising an intake hose having a predetermined length and a predetermined diameter both selected to minimize said sound of said gas being taken into said compressor.

7. The combination of claim 6, said machine comprising a compact housing, said compressor and said intake hose being mounted within said housing, said machine comprising means defining at least one relatively small space within said housing, and means to locate the intake end of said compressor intake hose in said relatively small space, whereby the sound deadening effect of said intake hose is further enhanced by locating said intake end in said relatively small space.

8. The combination of claim 7, said relatively small space defining means comprising an adsorbent bed module comprising at least one of said vessel for containing a bed of adsorbent material.

9. The combination of claim 8, said bed module comprising at least two bed vessels of circular cross-sectional shape and plate means joining said at least two vessels together longitudinally in side-by-side relationship, said plate means thereby defining a generally triangular shaped space between itself and the crotch between said at least two vessels, and said generally triangular space including said relatively small space for said intake end of said compressor intake hose.

10. The combination of claim 9, said means to locate said intake end of said hose in said triangular space comprising spaced apart upper and lower cut-outs formed in said plate means and extending into said triangular space, said upper cut-out being formed with an opening to snuggly receive said intake end of said hose, said lower cut-out comprising a stop for said hose when inserted through said opening in said upper cut-out, and said upper and lower cut-outs essentially defining the upper and lower ends of said relatively small space.

11. The combination of claim 1, said vessel being part of a compact PSA machine, a cabinet housing said machine, a front handle module for a cabinet for a compact PSA machine, said machine being adapted to stand on the floor in use, said cabinet comprising a front wall positioned substantially vertically, means to mount said handle module in said front wall, said handle module comprising a pair of walls recessed inwardly into the cabinet space and located at substantially 90 degrees to each other and at substantially 45 degrees to said front wall of said cabinet and with one of said walls upwardly facing and the other of said walls downwardly facing, and means to mount substantially all of the controls of said machine in said upwardly facing wall when said machine is positioned on the floor for use.

12. The combination of claim 11, the downwardly facing one of said walls of said handle module comprising the entrance for cooling air to the inside of said cabinet, and a filter member mounted in said downwardly facing wall such as to be readily mounted and dismounted from the outside of said handle module.

13. The combination of claim 11, said controls including a main on/off switch, a flow meter for the outlet oxygen enriched air, a pilot light and a fuse.

14. The combination of claim 13, and means to mount the main oxygen enriched air outlet on said vertical wall of said cabinet closely adjacent to said front handle module.

15. The combination of claim 11, and a rear handle module mounted on said cabinet substantially opposite said front handle, whereby said machine can be picked up by said front and rear handle modules, each of said front and rear handle modules including an uppermost horizontal portion by which a users fingers can lift the weight of said machine, and said horizontal portions comprising portions of the material of said cabinet bent in towards the space within said cabinet.

16. The combination of claim 1, and a cabinet for a a compact PSA machine comprising said vessel, means dividing the space within said cabinet into at least a first space and a second space, motor/compressor means mounted in said first space, insulating means lining substantially all of the inside surfaces of said cabinet defining said first and second spaces, means to permit the entry of a stream of ambient air into said second space, said means defining said first and second spaces including an opening to permit the flow of said stream of ambient air from said first space into said second space, fan means in said second space to drive said stream of ambient air out of said first space, and said motor/compressor being located in said first space with respect to the opening between said first and second spaces and with respect to said air inlet opening means in said second space such that the sound of said motor/compressor must take a torturous path before being able to exit from said cabinet.

17. The combination of claim 16, said air entry means comprising a front handle module mounted on said cabinet and said front handle module including filter means for filtering the stream of ambient air entering said cabinet.

18. The combination of claim 16, said second space including wall means for mounting said fan means, said wall means defining a chamber in which said fan means are mounted, said chamber being defined by said wall means in combination with the adjacent portions of the outside wall of said cabinet, and said adjacent portion of said cabinet being formed with louvers to permit the exit of the stream of ambient air flowing through said machine.

19. The combination of claim 1, said vessel comprising part of a prefabricated adsorbent bed module used in a system of fabricating a compact machine for separating a gas out of a mixture of gases utilizing a PSA technique, the combination comprising a plurality of said prefabricated modules to fabricate said machine; said modules including a cabinet module, adsorbent bed module, an electrical deck module on which are mounted a substantial number of components needed to carry out the PSA cycle performed by said machine, and a front handle module in which is mounted substantially all of the user operated controls needed to operate said machine; and means to assemble all of said various modules together to thereby simplify the manufacture of said machine.

20. The combination of claim 19, said electrical deck module dividing the space within said cabinet into upper and lower sections, said machine also comprising a motor/compressor unit, and means to mount said motor/compressor unit in said lower section.

21. The combination of claim 1, said vessel comprising part of a PSA machine, said machine comprising an electrical control circuit and a compressor, at least one said vessel containing a bed of adsorbent material, and plurality of solenoid valves to control the gas flows into and out of said at least one vessel; means to connect at least one of said solenoid valves into said machine in such a manner that a gas flow through said at least one absorbent bed and said solenoid valve will exhaust to atmosphere in one position of said solenoid valve, a time delay means connected in saeries circuit with the electrical portion of said at least one solenoid valve and said time delay means being so arranged that said solenoid valve vents the output of said compressor for a period of time equal to the time delay built into said time delay means when said compressor is first started up, whereby said compressor is permitted to reach operating speed under a no load condition, and whereby said at least one solenoid valve is then normally controlled by other portions of said control circuit during continuing operation of said machine after said time delay at start up has timed out.

22. The combination of claim 1, said vessel comprising part of a PSA machine, a system for mounting a motor/compressor in a compact cabinet for said PSA machine and for safely securing said motor/compressor for shipment, means defining a space within said cabinet to house said motor/compressor, a layer of foam plastic insulating material on the lowermost wall of said cabinet defining said motor/compressor space, plate means secured to the underside of said motor/compressor, said motor/compressor via said plate means normally resting of its own weight only on said layer of foam plastic material, said system comprising bolt means mounted on said lowermost wall of said cabinet defining said motor/compressor space and extending through a suitably formed opening in said plate means, and manually operated securing means cooperable with said bolt means for securing said plate with said compressor mounted thereof in position in said motor/compressor space in said cabinet for shipment.

23. In a machine for separating a component gas out of a mixture of gases using a PSA technique, said machine including a gas compressor, means for deadening the sound of the gas intake to said compressor, and said sound deadening means comprising an intake hose having a predetermined length and a predetermined diameter both selected to minimize said sound of said gas being taken into said compressor.

24. The combination of claim 23, said machine comprising a compact housing, said compressor and said intake hose being mounted within said housing, said machine comprising means defining at least one relatively small space within said housing, and means to locate the intake end of said compressor intake hose in said relatively small space, whereby the sound deadening effect of said intake hose is further enhanced by locating said intake end in said relatively small space.

25. The combination of claim 24, said relatively small space defining means comprising an adsorbent bed module comprising at least one vessel for containing a bed of adsorbent material.

26. The combination of claim 25, said bed module comprising at least two bed vessels of circular cross-sectional shape and plate means joining said at least two vessels together longitudinally in side-by-side relationship, said plate means thereby defining a generally triangular shaped space between itself and the crotch between said at least two vessels, and said generally triangular space including said relatively small space for said intake end of said compressor intake hose.

27. The combination of claim 26, said means to locate said intake end of said hose in said triangular space comprising spaced apart upper and lower cut-outs formed in said plate means and extending into said triangular space, said upper cut-out being formed with an opening to snuggly receive said intake end of said hose, said lower cut-out comprising a stop for said hose when inserted through said opening in said upper cut-out, and said upper and lower cut-outs essentially defining the upper and lower ends of said relatively small space.

28. The combination of claim 23, said machine being housed in a compact cabinet, a front handle module for said cabinet, said machine being adapted to stand on the floor in use, said cabinet comprising a front wall positioned substantially vertically, means to mount said handle module in said front wall, said handle module comprising a pair of walls recessed inwardly into the cabinet space and located at substantially 90 degrees to each other and at substantially 45 degrees to said front wall of said cabinet and with one of said walls upwardly facing and the other of said walls downwardly facing, and means to mount substantially all of the controls of said machine in said upwardly facing wall when said machine is positioned on the floor for use.

29. The combination of claim 28, the downwardly facing one of said walls of said handle module comprising the entrance for cooling air to the inside of said cabinet, and a filter member mounted in said downwardly facing wall such as to be readily mounted and dismounted from the outside of said handle module.

30. The combination of claim 28, said controls including a main on/off switch, a flow meter for the outlet oxygen enriched air, a pilot light and a fuse.

31. The combination of claim 30, and means to mount the main oxygen enriched air outlet on said vertical wall of said cabinet closely adjacent to said front handle module.

32. The combination of claim 28, and a rear handle module mounted on said cabinet substantially opposite said front handle, whereby said machine can be picked up by said front and rear handle modules, each of said front and rear handle modules including an uppermost horizontal portion by which a users fingers can lift the weight of said machine, and said horizontal portions comprising portions of the material of said cabinet bent in towards the space within said cabinet.

33. The combination of claim 23, a compact cabinet for said machine comprising means dividing the space within said cabinet into at least a first space and a second space, said gas compressor comprising motor/compressor means mounted in said first space, insulating means lining substantially all of the inside surfaces of said cabinet defining said first and second spaces, means to permit the entry of a stream of ambient air into said second space, said means defining said first and second spaces including an opening to permit the flow of said stream of ambient air from said first space into said second space, fan means in said second space to drive said stream of ambient air out of said first space, and said motor/compressor being located in said first space with respect to the opening between said first and second spaces and with respect to said air inlet opening means in said second space such that the sound of said motor/compressor must take a torturous path before being able to exit from said cabinet.

34. The combination of claim 33, said air entry means comprising a front handle module mounted on said cabinet, and said front handle module including filter means for filtering the stream of ambient air entering said cabinet.

35. The combination of claim 33, said second space including wall means for mounting said fan means, said wall means defining a chamber in which said fan means are mounted, said chamber being defined by said wall means in combination with the adjacent portions of the outside wall of said cabinet, and said adjacent portion of said cabinet being formed with louvers to permit the exit of the stream of ambient air flowing through said machine.

36. The combination of claim 23, and a system of fabricating said machine so that it is compact and of relatively low weight, the combination comprising a plurality of prefabricated modules to fabricate said machine; said modules including a cabinet module, an adsorbent bed module, an electrical deck module on which are mounted a substantial number of the components needed to carry out the PSA cycle performed by said machine, and a front handle module in which is mounted substantially all of the user operated controls needed to operate said machine; and means to assemble all of said various modules together to thereby simplify the manufacture of said machine.

37. The combination of claim 36, said electrical deck module dividing the space within said cabinet into upper and lower sections, and means to mount said gas compressor in said lower section.

38. The combination of claim 23, and an electrical control circuit for said PSA machine which comprises at least one vessel containing a bed of adsorbent material, and a plurality of solenoid valves to control the gas flows into and out of said at least one vessel; means to connect at least one of said solenoid valves into said machine in such a manner that a gas flow through said at least one absorbent bed and solenoid valve will exhaust to atmosphere in one position of said solenoid valve, a time display means connected in series circuit with the electrical portion of said at least one solenoid valve and said time delay means being so arranged that said solenoid valve vents the output of said compressor for a period of time equal to the time delay built into said time delay means when said compressor is first started up, whereby said compressor is permitted to reach operating speed under a no load condition, and whereby said at least one solenoid valve is then normally controlled by other portions of said control circuit during continuing operation of said machine after said time delay at start up has timed out.

39. The combination of claim 23, said gas compressor comprising a motor/compressor, a system for mounting said motor/compressor in a compact cabinet for a PSA machine, and for safely securing said motor/compressor for shipment, means defining a space within said cabinet to house said motor/compressor, a layer of foam plastic insulating material on the lowermost wall of said cabinet defining said motor/compressor space, plate means secured to the underside of said motor/compressor, said motor/compressor via said plate means normally resting of its own weight only on said layer of foam plastic material, said system comprising bolt means mounted on said lowermost wall of said cabinet defining said motor/compressor space and extending through a suitably formed opening in said plate means, and manually operated securing means cooperable with said bolt means for securing said plate with said compressor mounted thereof in position in said motor/compressor space in said cabinet for shipment.

40. A front handle module for a cabinet for a compact PSA machine, said machine being adapted to stand on the floor in use, said cabinet comprising a front wall positioned substantially vertically, means to mount said handle module in said front wall, said handle module comprising a pair of walls recessed inwardly into the cabinet space and located at substantially 90 degrees to each other and at substantially 45 degrees to said front wall of said cabinet and with one of said walls upwardly facing and the other of said walls downwardly facing, and means to mount substantially all of the controls of said machine in said upwardly facing wall when said machine is positioned on the floor for use.

41. The combination of claim 40, the downwardly facing one of said walls of said handle module comprising the entrance for cooling air to the inside of said cabinet, and a filter member mounted in said downwardly facing wall such as to be readily mounted and dismounted from the outside of said handle module.

42. The combination of claim 40, said controls including a main on/off switch, a flow meter for the outlet oxygen enriched air, a pilot light and a fuse.

43. The combination of claim 42, and means to mount the main oxygen enriched air outlet on said vertical wall of said cabinet closely adjacent to said front handle module.

44. The combination of claim 40, and a rear handle module mounted on said cabinet substantially opposite said front handle, whereby said machine can be picked up by said front and rear handle modules, each of said front and rear handle modules including an uppermost horizontal portion by which a users fingers can lift the weight of said machine, and said horizontal portions comprising portions of the material of said cabinet bent in towards the space within said cabinet.

45. The combination of claim 40, said compact cabinet comprising means dividing the space within said cabinet into at least a first space and a second space, motor/compressor means mounted in said first space, insulating means lining substantially all of the inside surfaces of said cabinet defining said first and second spaces, means to permit the entry of a stream of ambient air into said second space, said means defining said first and second spaces including an opening to permit the flow of said stream of ambient air from said first space into said second space, fan means in said second space to drive said stream of ambient air out of said first space, and said motor/compressor being located in said first space with respect to the opening between said first and second spaces and with respect to said air inlet opening means in said second space such that the sound of said motor/compressor must take a torturous path before being able to exit from said cabinet.

46. The combination of claim 45, said air entry means comprising a front handle module mounted on said cabinet, and said front handle module including filter means for filtering the stream of ambient air entering said cabinet.

47. The combination of claim 45, said second space including wall means for mounting said fan means, said wall means defining a chamber in which said fan means are mounted, said chamber being defined by said wall means in combination with the adjacent portions of the outside wall of said cabinet, and said adjacent portion of said cabinet being formed with louvers to permit the exit of the stream of ambient air flowing through said machine.

48. The combination of claim 40, said front handle module being prefabricated for use in a system of fabricating a compact machine for separating a gas out of a mixture of gases utilizing a PSA technique, the combination comprising utilizing a plurality of said prefabricated modules to fabricate said machine; said modules including a cabinet module, and adsorbent bed module, an electric deck module on which are mounted a substantial number of the components needed to carry out the PSA cycle performed by said machine, and said front handle module; and means to assemble all of said various modules together to thereby simplify the manufacture of said machine.

49. The combination of claim 48, said electrical deck module dividing the space within said cabinet into upper and lower sections, said machine also comprising a motor/compressor unit, and means to mount said motor/compressor unit in said lower section.

50. The combination of claim 40, said machine comprising a compressor and an electrical control circuit, at least one vessel containing a bed of adsorbent material, and a plurality of solenoid valves to control the gas flows into and out of said at least one vessel; means to connect at least one of said solenoid valves into said machine in such a manner that a gas flow through said at least one absorbent bed and solenoid valve will exhaust to atmosphere in one position of said solenoid valve, a time delay means connected in series circuit with the electrical portion of said at least one solenoid valve and said time delay means being so arranged that said solenoid valve vents the output of said compressor for a period of time equal to the time delay built into said time delay means when said compressor is first started up, whereby said compressor is permitted to reach operating speed under a no load condition, and whereby said at least one solenoid valve is then normally controlled by other portions of said control circuit during continuing operation of said machine after said time delay at start up has timed out.

51. The combination of claim 40, said machine comprising a motor/compressor and a system for mounting said motor/compressor in said compact cabinet, and for safely securing said motor/compressor for shipment, means defining a space within said cabinet to house said motor/compressor, a layer of foam plastic insulating material on the lowermost wall of said cabinet defining said motor/compressor space, plate means secured to the underside of said motor/compressor, said motor/compressor via said plate means normally resting of its own weight only on said layer of foam plastic material, said system comprising bolt means mounted on said lowermost wall of said cabinet defining said motor/compressor space and extending through a suitably formed opening in said plate means, and manually operated securing means cooperable with said bolt means for securing said plate with said compressor mounted thereof in position in said motor/compressor space in said cabinet for shipment.

52. A cabinet for a compact PSA machine comprising means dividing the space within said cabinet into at least a first space and a second space, motor/compressor means mounted in said first space, insulating means lining substantially all of the inside surfaces of said cabinet defining said first and second spaces, means to permit the entry of a stream of ambient air into said second space, said means defining said first and second spaces including an opening to permit the flow of said stream of ambient air from said first space into said second space, fan means in said second space to drive said stream of ambient air out of said first space, and said motor/compressor being located in said first space with respect to the opening between said first and second spaces and with respect to said air inlet opening means in said second space such that the sound of said motor/- compressor must take a torturous path before being able to exit from said cabinet.

53. The combination of claim 52, said air entry means comprising a front handle module mounted on said cabinet, and said front handle module including filter means for filtering the stream of ambient air entering said cabinet.

54. The combination of claim 52, said second space including wall means for mounting said fan means, said wall means defining a chamber in which said fan means are mounted, said chamber being defined by said wall means in combination with the adjacent portions of the outside wall of said cabinet, and said adjacent portion of said cabinet being formed with louvers to permit the exit of the stream of ambient air flowing through said machine.

55. The combination of claim 52, and a system for fabricating said compact machine comprising a plurality of prefabricated modules to fabricate said machine; said modules including said cabinet as a module, an adsorbent bed module, an electric deck module on which are mounted a substantial number of the components needed to carry out the PSA cycle performed by said machine, and a front handle module in which is mounted substantially all of the user operated controls needed to operate said machine; and means to assemble all of said various modules together to thereby simplify the manufacture of said machine.

56. The combination of claim 52, and an electrical control circuit for said, at least one vessel containing a bed of adsorbent material, and a plurality of solenoid valves to control the gas flows into and out of said at least one vessel; means to connect at least one of said solenoid valves into said machine in such a manner that a gas flow through said at least one absorbent bed and solenoid valve will exhaust to atmosphere in one position of said solenoid valve, a time delay means connected in series circuit with the electrical portion of said at least one solenoid valve and said time delay means being so arranged that said solenoid valve vents the output of said compressor for a period of time equal to the time delay built into said time delay means when said compressor is first started up, whereby said compressor is permitted to reach operating speed under a no load condition, and whereby said at least one solenoid valve is then normally controlled by other portions of said control circuit during continuing operation of said machine after said time delay at start up has timed out.

57. The combination of claim 52, and a system for mounting said motor/compressor in a compact cabinet for said PSA machine, and for safely securing said motor/compressor into said first space for shipment, a layer of foam plastic insulating material on the lowermost wall of said cabinet defining said motor/compressor first space, plate means secured to the underside of said motor/compressor, said motor/compressor via said plate means normally resting of its own weight only on said layer of foam plastic material, said system comprising bolt means mounted on said lowermost wall of said cabinet defining said motor/compressor first space and extending through a suitably formed opening in said plate means, and manually operated securing means cooperable with said bolt means for securing said plate with said compressor mounted thereof in position in said motor/compressor first space in said cabinet for shipment.

58. A system of fabricating a compact machine for separating a gas out of a mixture of gases utilizing a PSA technique, the combination comprising a plurality of prefabricated modules to fabricate said machine; said modules including a cabinet module, an adsorbent bed module, an electrical deck module on which are mounted a substantial number of the components needed to carry out the PSA cycle performed by said machine, and a front handle module in which is mounted substantially all of the user operated controls needed to operate said machine; and means to assemble all of said various modules together to thereby simplify the manufacture of said machine.

59. The combination of claim 1, said electrical deck module dividing the space within said cabinet into upper and lower sections, said machine also comprising a motor/compressor unit, and means to mount said motor/compressor unit in said lower section.

60. The combination of claim 58, and an electrical control circuit for said PSA machine, said machine comprising a compressor, at least one vessel containing a bed of adsorbent material, and a plurality of solenoid valves to control the gas flows into and out of said at least one vessel; means to connect at least one of said solenoid valves into said machine in such a manner that a gas flow through said at least one absorbent bed and solenoid valve will exhaust to atmosphere in one position of said solenoid valve, a time delay means connected in series circuit with the electrical portion of said at least one solenoid valve and said time delay means being so arranged that said solenoid valve vents the output of said compressor for a period of time equal to the time delay built into said time delay means when said compressor is first started up, whereby said compressor is permitted to reach operating speed under a no load condition, and whereby said at least one solenoid valve is then normally controlled by other portions of said control circuit during continuing operation of said machine after said time delay at start up has timed out.

61. The combination of claim 58, said machine comprising a motor/compressor, a system for mounting said motor/compressor in a compact cabinet for said PSA machine, and for safely securing said motor/compressor for shipment, means defining a space within said cabinet to house said motor/compressor, a layer of foam plastic insulating material on the lowermost wall of said cabinet defining said motor/compressor space, plate means secured to the underside of said motor/compressor, said motor/compressor via said plate means normally resting of its own weight only on said layer of foam plastic material, said system comprising bolt means mounted on said lowermost wall of said cabinet defining said motor/compressor space and extending through a suitably formed opening in said plate means, and manually operated securing means cooperable with said bolt means for securing said plate with said compressor mounted thereof in position in said motor/compressor space in said cabinet for shipment.

62. An electrical control circuit for a PSA machine which comprises a compressor, at least one vessel containing a bed of adsorbent material, and a plurality of solenoid valves to control the gas flows into and out of said at least one vessel; means to connect at least one of said solenoid valves into said machine in such a manner that a gas flow through said at least one absorbent bed and solenoid valve will exhaust to atmosphere in one position of said solenoid valve, a time delay means connected in series circuit with the electrical portion of said at least one solenoid valve and said time delay means being so arranged that said solenoid valve vents the output of said compressor for a period of time equal to the time delay built into said time delay means when said compressor is first started up, whereby said compressor is permitted to reach operating speed under a no load condition, and whereby said at least one solenoid valve is then normally controlled by other portions of said control circuit during continuing operation of said machine after said time delay at start up has timed out.

63. The combination of claim 62, said compressor comprising a motor/compressor, a system for mounting said motor/compressor in a compact cabinet for said PSA machine, and for safely securing said motor/compressor for shipment, means defining a space within said cabinet to house said motor/compressor, a layer of foam plastic insulating material on the lowermost wall of said cabinet defining said motor/compressor space, plate means secured to the underside of said motor/compressor, said motor/compressor via said plate means normally resting of its own weight only on said layer of foam plastic material, said system comprising bolt means mounted on said lowermost wall of said cabinet defining said motor/compressor space and extending through a suitably formed opening in said plate means, and manually operated securing means cooperable with said bolt means for securing said plate with said compressor mounted thereof in position in said motor/compressor space in said cabinet for shipment.

64. A system for mounting a motor/compressor in a compact cabinet for a PSA machine, and for safely securing said motor/compressor for shipment, means defining a space within said cabinet to house said motor/compressor, a layer of foam plastic insulating material on the lowermost wall of said cabinet defining said motor/compressor space, plate means secured to the underside of said motor/compressor, said motor/compressor via said plate means normally resting of its own weight only on said layer of foam plastic material, said system comprising bolt means mounted on said lowermost wall of said cabinet defining said motor/compressor space and extending through a suitably formed opening in said plate means, and manually operated securing means cooperable with said bolt means for securing said plate with said compressor mounted thereof in position in said motor/compressor space in said cabinet for shipment.

* * * * *